US011242802B2

United States Patent
(12) United States Patent
Yeung et al.

(10) Patent No.: US 11,242,802 B2
(45) **Date of Patent: *Feb. 8, 2022**

(54) TURBINE ENGINE EXHAUST DUCT SYSTEM AND METHODS FOR NOISE DAMPENING AND ATTENUATION

(71) Applicant: BJ Energy Solutions, LLC, Houston, TX (US)

(72) Inventors: Tony Yeung, Tomball, TX (US); Ricardo Rodriguez-Ramon, Tomball, TX (US); Heber Martinez-Barron, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,325

(22) Filed: Feb. 23, 2021

(65) Prior Publication Data

US 2021/0270188 A1 Sep. 2, 2021

Related U.S. Application Data

(63) Continuation of application No. 16/948,290, filed on Sep. 11, 2020, now Pat. No. 10,961,914.

(Continued)

(51) Int. Cl.

| | |
|---|---|
| ***F02C 7/24*** | (2006.01) |
| ***F01D 25/30*** | (2006.01) |
| ***F02C 6/00*** | (2006.01) |

(52) U.S. Cl.

CPC ................ *F02C 7/24* (2013.01); *F01D 25/30* (2013.01); *F02C 6/00* (2013.01); *F05D 2220/32* (2013.01);

(Continued)

(58) Field of Classification Search

CPC .... F02C 6/00; F02C 7/045; F02C 7/24; B60P 3/00; H02K 7/1823; F01D 25/30

See application file for complete search history.

(56) References Cited

U.S. PATENT DOCUMENTS

| | | | |
|---|---|---|---|
| 2,940,377 | A | 6/1960 | Darnell et al. |
| 2,947,141 | A | 8/1960 | Russ |

(Continued)

FOREIGN PATENT DOCUMENTS

| | | |
|---|---|---|
| CA | 2043184 | 8/1994 |
| CA | 2829762 | 9/2012 |

(Continued)

OTHER PUBLICATIONS

AFGlobal Corporation, Durastim Hydraulic Fracturing Pump, A Revolutionary Design for Continuous Duty Hydraulic Fracturing, 2018.

(Continued)

*Primary Examiner* — Arun Goyal

(74) *Attorney, Agent, or Firm* — Womble Bond Dickinson (US) LLP

(57) ABSTRACT

A mobile fracking system and methods may include a gas turbine housed at least partially inside a trailer and an exhaust attenuation system configured to receive exhaust gas from the gas turbine. The exhaust attenuation system may include a lower elongated plenum configured to receive exhaust gas from the gas turbine and an upper noise attenuation system that is movably connected relative to a distal end of the lower elongated plenum.

10 Claims, 6 Drawing Sheets

10 12 18 16 14 20 52 50 40 271.8 in. 89.66 in. 30 194.4 in. 35.75 in. 32 22

Related U.S. Application Data

(60) Provisional application No. 62/704,567, filed on May 15, 2020, provisional application No. 62/899,957, filed on Sep. 13, 2019.

(52) U.S. Cl.
CPC .. *F05D 2220/70* (2013.01); *F05D 2260/4031* (2013.01)

(56) References Cited

U.S. PATENT DOCUMENTS 3,068,796 A 12/1962 Pfluger et al.
3,463,612 A 8/1969 Whitsel
3,550,696 A 12/1970 Kenneday
3,739,872 A * 6/1973 McNair .................. F01D 25/30 181/218
3,786,835 A 1/1974 Finger
4,059,045 A 11/1977 McClain
4,204,808 A 5/1980 Reese et al.
4,330,237 A 5/1982 Battah
4,383,478 A 5/1983 Jones
4,402,504 A * 9/1983 Christian .............. A63B 21/06 482/103
4,483,684 A 11/1984 Black
4,574,880 A 3/1986 Handke
4,584,654 A 4/1986 Crane
4,672,813 A 6/1987 David
4,869,209 A 9/1989 Young
5,135,361 A 8/1992 Dion
5,553,514 A 9/1996 Walkowc
5,586,444 A 12/1996 Fung
5,626,103 A 5/1997 Haws et al.
5,720,598 A 2/1998 de Chizzelle
6,074,170 A 6/2000 Bert et al.
6,230,481 B1 5/2001 Jahr
7,143,016 B1 11/2006 Discenzo et al.
7,789,452 B2 9/2010 Dempsey et al.
8,414,673 B2 4/2013 Raje et al.
8,757,918 B2 6/2014 Ramnarain et al.
8,784,081 B1 7/2014 Blume
9,206,667 B2 12/2015 Khvoshchev et al.
9,222,346 B1 12/2015 Walls
9,488,169 B2 11/2016 Cochran et al.
10,008,912 B2 6/2018 Davey et al.
10,024,123 B2 7/2018 Steffenhagen et al.
10,060,293 B2 8/2018 Del Bono
10,077,933 B2 9/2018 Nelson et al.
10,094,366 B2 10/2018 Marica
10,138,098 B2 11/2018 Sorensen et al.
10,317,875 B2 6/2019 Pandurangan et al.
10,478,753 B1 11/2019 Elms et al.
10,815,764 B1 10/2020 Yeung et al.
10,859,203 B1 12/2020 Cui et al.
10,864,487 B1 12/2020 Han et al.
10,870,093 B1 12/2020 Zhong et al.
10,895,202 B1 1/2021 Yeung et al.
10,907,459 B1 2/2021 Yeung et al.
10,927,774 B2 2/2021 Cai et al.
10,954,770 B1 3/2021 Yeung et al.
10,954,855 B1 3/2021 Ji et al.
10,961,908 B1 3/2021 Yeung et al.
10,961,912 B1 3/2021 Yeung et al.
10,961,914 B1 3/2021 Yeung et al.
10,961,993 B1 3/2021 Ji et al.
10,982,523 B1 4/2021 Hill et al.
10,989,019 B2 4/2021 Cai et al.
10,995,564 B2 5/2021 Miller et al.
11,035,214 B2 6/2021 Cui et al.
11,047,379 B1 6/2021 Li et al.
11,053,853 B2 7/2021 Li et al.
11,105,250 B1 8/2021 Zhang et al.
11,105,266 B2 8/2021 Zhou et al.
11,125,156 B2 9/2021 Zhang et al.
11,143,000 B2 10/2021 Li et al.
11,143,006 B1 10/2021 Zhang et al.
2004/0074238 A1 4/2004 Wantanabe et al.
2004/0076526 A1 4/2004 Fukano et al.
2005/0051322 A1 3/2005 Speer
2006/0061091 A1 3/2006 Osterloh
2006/0062914 A1 3/2006 Garg et al.
2006/0211356 A1 9/2006 Grassman
2007/0066406 A1 3/2007 Keller et al.
2007/0125544 A1 6/2007 Robinson et al.
2009/0068031 A1 3/2009 Gambier et al.
2010/0218508 A1 9/2010 Brown et al.
2011/0052423 A1 3/2011 Gambier et al.
2011/0146244 A1 6/2011 Farman et al.
2011/0146246 A1 6/2011 Farman et al.
2012/0137699 A1 6/2012 Montagne et al.
2012/0179444 A1 7/2012 Ganguly et al.
2012/0192542 A1 8/2012 Chillar et al.
2012/0204627 A1 8/2012 Anderl et al.
2013/0087045 A1 4/2013 Sullivan et al.
2013/0189915 A1 7/2013 Hazard
2013/0259707 A1 10/2013 Yin
2014/0013768 A1 1/2014 Laing et al.
2014/0032082 A1 1/2014 Gehrke et al.
2014/0090729 A1 4/2014 Coulter et al.
2014/0094105 A1 4/2014 Lundh et al.
2014/0123621 A1 5/2014 Driessens et al.
2014/0144641 A1 5/2014 Chandler
2014/0216736 A1 8/2014 Leugemors et al.
2014/0219824 A1 8/2014 Burnette
2015/0129210 A1 5/2015 Chong et al.
2015/0211512 A1 7/2015 Wiegman et al.
2015/0226140 A1 8/2015 Zhang et al.
2015/0252661 A1 9/2015 Glass
2015/0340864 A1 11/2015 Compton
2015/0345385 A1 12/2015 Santini
2016/0195082 A1 7/2016 Wiegman et al.
2016/0258267 A1 9/2016 Payne et al.
2016/0326845 A1 11/2016 Djikpesse et al.
2017/0074089 A1 3/2017 Agarwal et al.
2017/0089189 A1 3/2017 Norris et al.
2017/0114613 A1 4/2017 Lecerf et al.
2017/0114625 A1 4/2017 Norris et al.
2017/0191350 A1 7/2017 Johns et al.
2017/0226998 A1 8/2017 Zhang et al.
2017/0233103 A1 8/2017 Teicholz et al.
2017/0306847 A1 10/2017 Suciu et al.
2017/0322086 A1 11/2017 Luharuka
2017/0335842 A1 11/2017 Robinson et al.
2017/0370480 A1 12/2017 Witkowski et al.
2018/0209415 A1 7/2018 Zhang et al.
2018/0290877 A1 10/2018 Shock
2018/0298731 A1 10/2018 Bishop
2019/0011051 A1 1/2019 Yeung
2019/0063341 A1 2/2019 Davis
2019/0078471 A1 3/2019 Braglia et al.
2019/0128288 A1 5/2019 Konada et al.
2019/0153843 A1 5/2019 Headrick
2019/0211814 A1 7/2019 Weightman et al.
2019/0257297 A1 8/2019 Botting et al.
2019/0309585 A1 10/2019 Miller et al.
2019/0353103 A1 11/2019 Roberge
2019/0376449 A1 12/2019 Carrell
2020/0011165 A1 1/2020 George et al.
2020/0072201 A1 3/2020 Marica
2020/0166026 A1 5/2020 Marica
2020/0267888 A1 8/2020 Putz
2020/0291731 A1 9/2020 Haiderer et al.
2020/0325752 A1 10/2020 Clark et al.
2020/0325893 A1 10/2020 Kraige et al.
2020/0332784 A1 10/2020 Zhang et al.
2020/0347725 A1* 11/2020 Morris ...................... F02C 6/00
2020/0362760 A1 11/2020 Morenko et al.
2020/0362764 A1 11/2020 Saintignan et al.
2020/0370394 A1 11/2020 Cai et al.
2020/0370408 A1 11/2020 Cai et al.
2020/0370429 A1 11/2020 Cai et al.
2020/0371490 A1 11/2020 Cai et al.
2020/0340322 A1 12/2020 Sizemore et al.
2020/0392827 A1 12/2020 George et al.

(56) References Cited

U.S. PATENT DOCUMENTS

2020/0393088 A1 12/2020 Sizemore et al.
2020/0407625 A1 12/2020 Stephenson
2020/0408149 A1 12/2020 Li et al.
2021/0025383 A1 1/2021 Bodishbaugh et al.
2021/0054727 A1 2/2021 Floyd
2021/0071574 A1 3/2021 Feng et al.
2021/0071579 A1 3/2021 Li et al.
2021/0071654 A1 3/2021 Brunson
2021/0071752 A1 3/2021 Cui et al.
2021/0086851 A1 3/2021 Zhang et al.
2021/0087883 A1 3/2021 Zhang et al.
2021/0087916 A1 3/2021 Zhang et al.
2021/0087925 A1 3/2021 Heidari et al.
2021/0087943 A1 3/2021 Cui et al.
2021/0088042 A1 3/2021 Zhang et al.
2021/0123425 A1 4/2021 Cui et al.
2021/0123434 A1 4/2021 Cui et al.
2021/0123435 A1 4/2021 Cui et al.
2021/0131409 A1 5/2021 Cui et al.
2021/0156240 A1 5/2021 Cicci et al.
2021/0156241 A1 5/2021 Cook
2021/0172282 A1 6/2021 Wang et al.
2021/0180517 A1 6/2021 Zhou et al.
2021/0199110 A1 7/2021 Albert et al.
2021/0222690 A1 7/2021 Beisel
2021/0246774 A1 8/2021 Cui et al.
2021/0285311 A1 9/2021 Ji et al.
2021/0285432 A1 9/2021 Ji et al.
2021/0301807 A1 9/2021 Cui et al.
2021/0306720 A1 9/2021 Sandoval et al.
2021/0308638 A1 10/2021 Zhong et al.
2021/0355927 A1 11/2021 Jian et al.

FOREIGN PATENT DOCUMENTS

CA 2919175 3/2021
CN 202926404 U 5/2013
EP 3075946 5/2019
WO 20110133821 10/2011
WO 2016/014476 1/2016
WO 2017123656 A 7/2017
WO 2019195651 10/2019
WO 2020046866 3/2020
WO 2020076569 4/2020
WO 2020097060 5/2020
WO 2021041783 3/2021

OTHER PUBLICATIONS

American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www. prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/ uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire .com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global. weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015,

(56) References Cited

OTHER PUBLICATIONS https://web.archive.org/web/20150314203227/https://www.rigzone.co m/news/oil-gas/a/124883/Turbine_Technology_Powers_Green_Field_ MultiFuel_Frack_Pump.
"Turbine Frac Units," WMD Squared (2012), https://wmdsquared.com/ work/gfes-turbine-frac-units/.
Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.
ISM, What is Cracking Pressure, 2019.
Swagelok, The right valve for controlling flow direction? Check, 2016.
Technology.org, Check valves how do they work and what are the main type, 2018.

* cited by examiner

TURBINE ENGINE EXHAUST DUCT SYSTEM AND METHODS FOR NOISE DAMPENING AND ATTENUATION

PRIORITY CLAIMS

This application is a continuation of U.S. Non-Provisional application Ser. No. 16/948,290, filed Sep. 11, 2020, titled "TURBINE ENGINE EXHAUST DUCT SYSTEM AND METHODS FOR NOISE DAMPENING AND ATTENUATION," which claims priority to and the benefit of, U.S. Provisional Application No. 62/704,567, filed May 15, 2020, titled "TURBINE ENGINE EXHAUST DUCT SYSTEM FOR NOISE DAMPENING AND ATTENUATION," and U.S. Provisional Application No. 62/899,957, filed Sep. 13, 2019, titled "TURBINE ENGINE EXHAUST DUCT SYSTEM FOR NOISE DAMPENING AND ATTENUATION," the disclosures of both of which are incorporated herein by reference in their entireties.

TECHNICAL FIELD

In one aspect, the present disclosure relates to noise attenuation and dampening systems and methods for hydraulic fracturing and, in particular, to systems and methods for dampening and directional control of exhaust air flow from a gas turbine of a direct drive turbine fracturing system.

BACKGROUND

The present disclosure relates generally to a mobile fracking system and, more particularly, to a gas turbine-based mobile fracking system that may provide mechanical power through gearboxes connected to respective gas turbines and respective mechanically driven fluid pumps in a fracturing operation (also referable to as "fracking"). Such a mobile fracking system may include a plurality of such directly driven turbine (DDT) fracturing units for use in well stimulation and hydraulic fracturing operations. In addition to offering potential efficiency advantages compared to diesel fleets or electric fleets, DDT fracturing units may offer flexibility in operating on a wide variety of fuel compositions, while also providing improved reliability, lower emissions and/or smaller foot prints.

In a fracturing operation, a fluid mixture is injected under pressure at a wellbore into a rock formation that bears hydrocarbon to create fractures within a rock. In operation, the pressurized fluid mixture is pressure pumped down to fracture the subsurface geological formation and allows the flow of the hydrocarbon reserves, such as oil and/or gas. The fluid mixture may include water, various chemical additives, and proppants (e.g., sand, ceramic materials, and the like as will be understood by those skilled in the art). For example, and without limitation, the fracturing fluid may comprise a liquid petroleum gas, linear gelled water, gelled water, gelled oil, slick water, slick oil, poly emulsion, foam/emulsion, liquid carbon dioxide ($CO_2$), nitrogen gas ($N_2$), and/or binary fluid and acid.

Mechanical power may be generated by the DDT fracturing units and used to deliver fracturing fluid through mechanically connected fluid pumps to a wellbore at the fracturing operation site. Surface pumping systems including fluid pumps are utilized to accommodate the various fluids and are typically mobilized at well sites on, for example, skids or tractor-trailers. In one conventional example, dedicated sources of power may include gas turbines connected to a source of natural gas that drives the respective gas turbine to produce mechanical power that may be sent to one or more of the surface pumping systems through mechanically connected gearboxes and/or transmission systems to operate the fluid pumps at desired speeds.

The fracturing operation site often encompasses a large footprint with the number of wells or wellheads and supporting components. The supporting components take time to be transported and to be setup for utilization at the fracturing operation sites. Due to the large nature of many fracturing operations, there exists a continued challenge to reduce the environmental impact resulting from fracturing operations. Accordingly, there exists a need for methods and systems for reducing the environmental impact of noise pollution produced by the fracturing operations.

SUMMARY

As referenced above, a fracturing operation may include a large number of gas turbines operating substantially concurrently. As a result, an undesirably large amount of noise may be generated by the fracturing operation.

The present disclosure is generally directed to systems and methods for dampening and directional control of exhaust air flow from a gas turbine of, for example, a direct drive turbine fracturing system. According to some embodiments, a mobile fracking system may include a trailer including a rear end, a front end, a bottom end, and a top end defining therebetween an interior space, a gas turbine housed inside the trailer in the interior space, and an exhaust attenuation system configured to receive exhaust gas from the gas turbine via an exhaust duct. The exhaust attenuation system may be attached to a portion of the trailer and may include a lower elongated plenum having an inlet adjacent the proximal end configured to receive exhaust gas from the gas turbine exhaust duct of the gas turbine and an upper noise attenuation system that is movably connected relative to the distal end of the lower elongated plenum. The upper noise attenuation system may be selectively movable between a stowed position, in which an outlet end portion of the upper noise attenuation system is positioned proximate to the distal end of the lower elongated plenum, and an operative position, in which the upper noise attenuation system defines an upper elongated plenum in fluid communication with the distal end of the lower elongated plenum and in which an outlet of the upper noise elongated plenum is spaced away from the distal end of the lower elongated plenum at a second distance that is greater than the first distance.

According to some embodiments, the upper noise attenuation system may include a pair of opposed and cooperating silencer hoods. In such embodiments, each silencer hood may have a planer surface having opposed side edges and a pair of opposing side surfaces that extend outwardly from portions of the respective side edges of the planer surface. Each silencer hood may be configured to be hingeably mounted to portions of a distal end of the lower elongated plenum such that, in the operative position, the pair of opposed silencer hoods are positioned substantially upright, so that the planer surfaces of the respective back edges are in parallel opposition and so that the respective side surface are also in parallel opposition to form the upper elongated plenum.

According to some embodiments, the upper noise attenuation system may optionally include an elongated conduit that has an exterior that is shaped and sized for complementary receipt therein a distal portion of the lower elongated plenum. In such embodiments, in the stowed position, the elongated conduit may be positioned substantially in the lower elongated plenum, such that an outlet end of the elongated conduit is positioned proximate to the distal end of the lower elongated plenum. In the operative position, the elongated conduit may be selectively movable along and about an exhaust axis outwardly away from the distal end of the lower elongated plenum, such that a proximal end of the elongated conduit is positioned proximate the distal end of the lower elongated plenum and the outlet end of the elongated conduit forms the outlet of the upper elongated plenum.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

DETAILED DESCRIPTION

Figure 1:
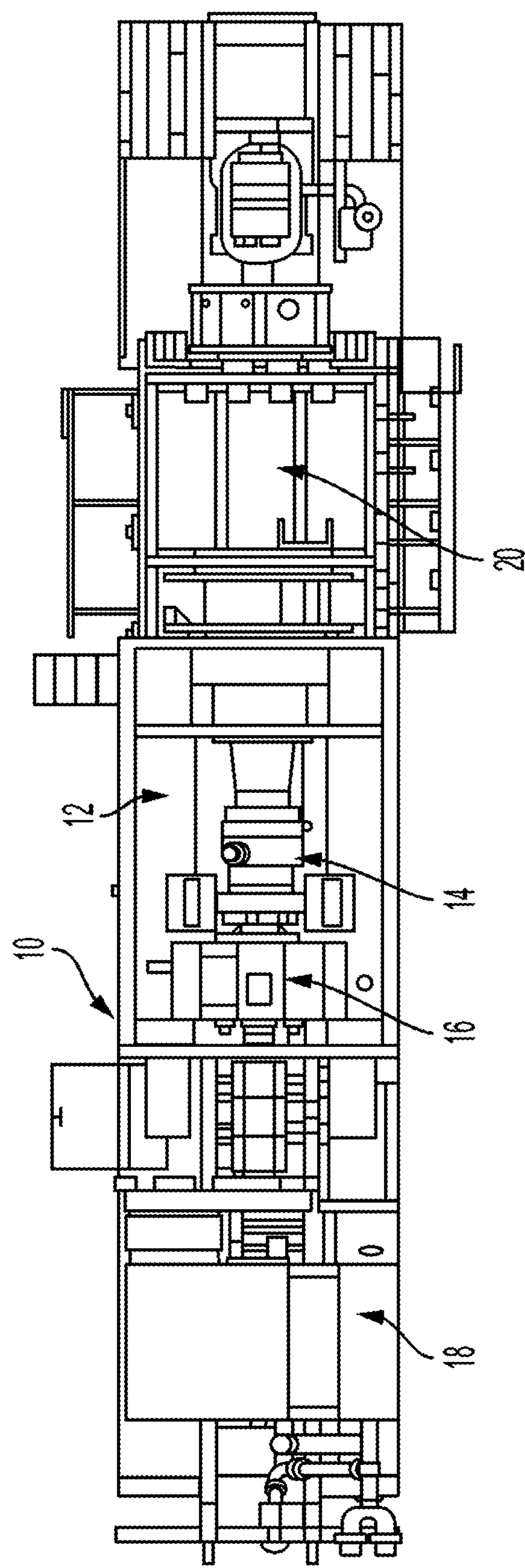
FIG. 1 is a schematic top view of an example of a mobile fracking system showing an example directly driven turbine fracturing unit having a gas turbine housed inside a trailer in an interior space within the trailer and showing a gearbox connected to the gas turbine for mechanically translating mechanical energy produced by the gas turbine to at least one fluid pump via a gearbox according to an embodiment of the disclosure.
Figure 2:
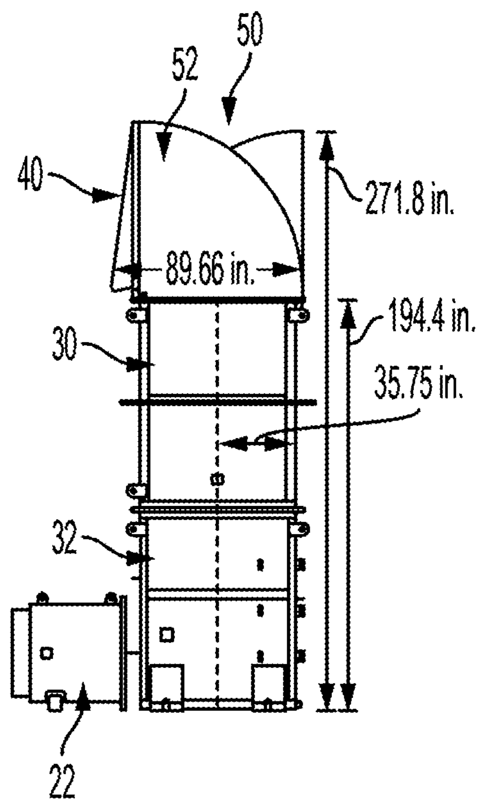
FIG. 2 illustrates an example exhaust attenuation system configured to receive exhaust gas from a gas turbine, the exhaust attenuation system including a lower elongated plenum configured to receive exhaust gas from the gas turbine and an upper noise attenuation system that is movably connected relative to the distal end of the lower elongated plenum, the upper noise attenuation system being shown in the extended operative position according to an embodiment of the disclosure.
Figure 3:
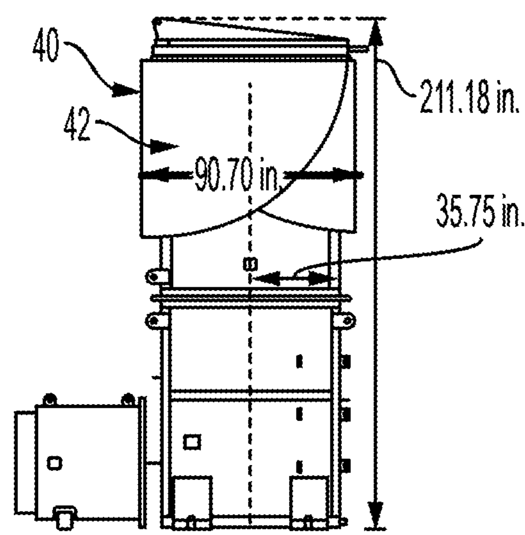
FIG. 3 illustrates an example exhaust attenuation system configured to receive exhaust gas from a gas turbine, the exhaust attenuation system including a lower elongated plenum configured to receive exhaust gas from the gas turbine and an upper noise attenuation system that is movably connected relative to the distal end of the lower elongated plenum, the upper noise attenuation system being shown in the stowed position according to an embodiment of the disclosure.
Figure 4:
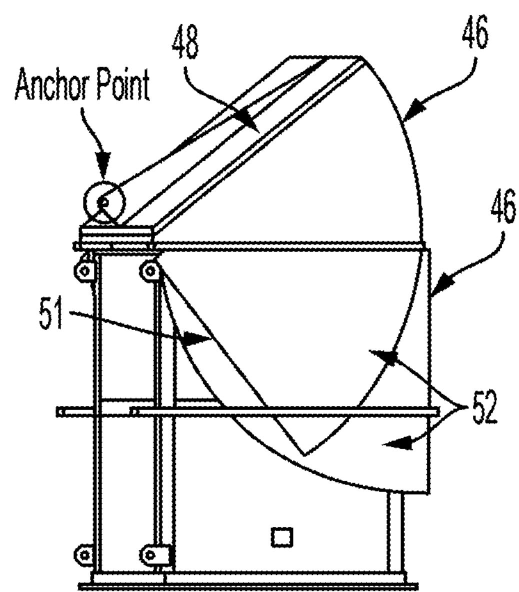
FIG. 4 shows an example exhaust attenuation system illustrating an upper noise attenuation system having a pair of opposed silencer hoods that are configured to be hingeably mounted to portions of the distal end of the lower elongated plenum and that are independently movable relative to each other according to an embodiment of the disclosure.
Figure 5:
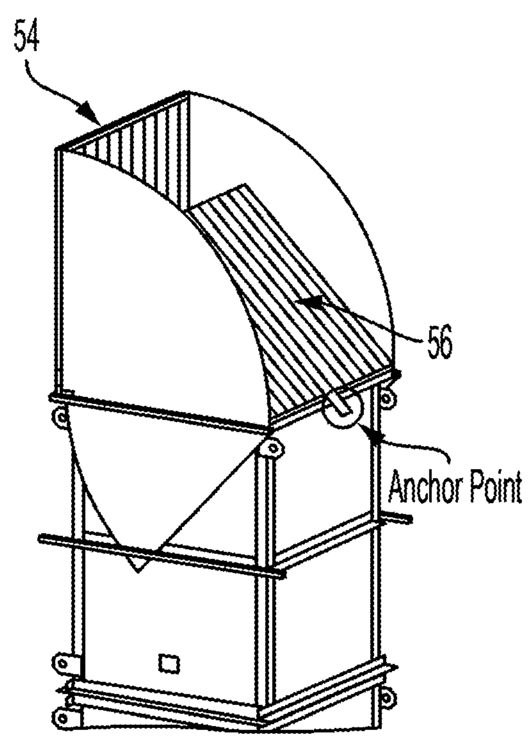
FIG. 5 shows an example lower silencer hood being moved to the operative position and shows an example upper silencer hood positioned in the operative position according to an embodiment of the disclosure.
Figure 6A:
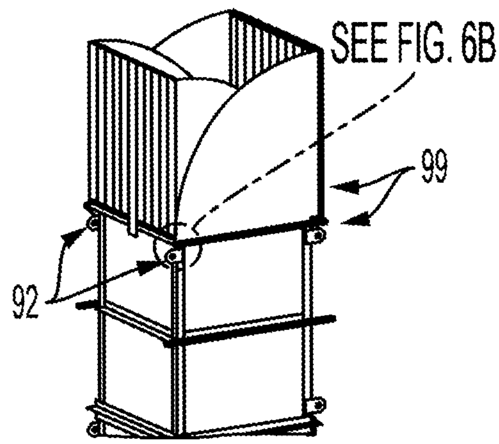
FIGS. 6A and 6B respectively show a perspective view and an enlarged perspective view of an example retention brace system having a first pair of opposing retention braces comprising a first brace mounted to exterior portions of the distal end of the lower elongated plenum and a second brace mounted to an opposed exterior portions of the distal end of the lower elongated plenum, each brace defining a slot that is sized and shaped for receipt of portions of respective side surfaces of the pair of silencer hoods according to an embodiment of the disclosure.
Figure 6B:
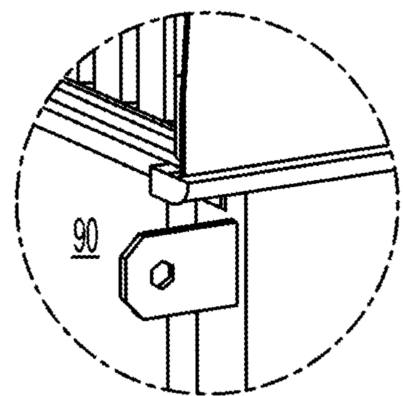
Figure 7:
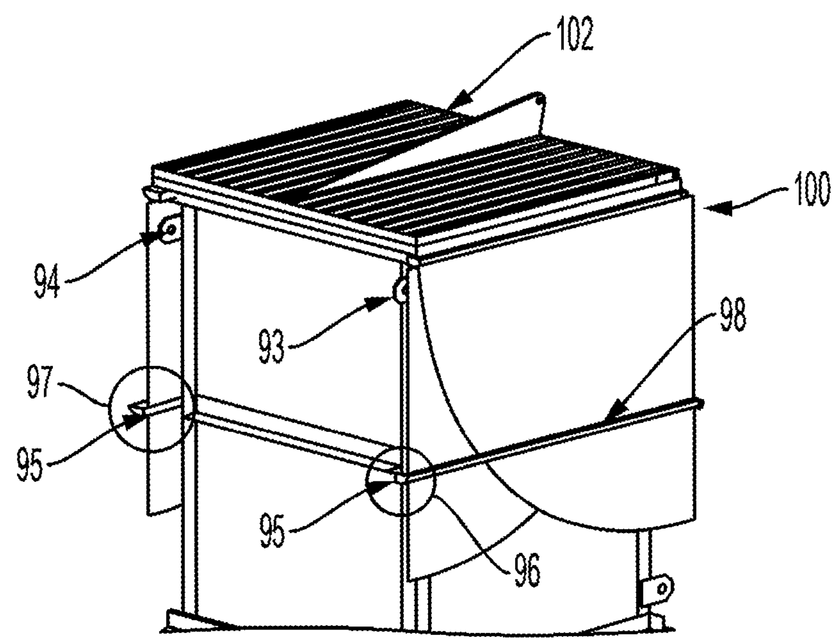
FIG. 7 shows an example retention brace system according to an embodiment of the disclosure having a first pair of opposing retention braces comprising a first brace mounted to exterior portions of the distal end of the lower elongated plenum and a second brace mounted to an opposed exterior portions of the distal end of the lower elongated plenum, each brace defining a slot that is sized and shaped for receipt of portions of respective side surfaces of the pair of silencer hoods and a second pair of opposing retention braces comprising a third brace spaced proximally from the first brace and mounted to exterior portions the lower elongated plenum and a fourth brace spaced proximally from the first brace and mounted to an opposed exterior portions of the lower elongated plenum, each brace defining a slot that is sized and shaped for receipt of respective side surfaces of the pair of silencer hoods when the pair of silencer hoods is positioned in the stowed position.
Figure 8:
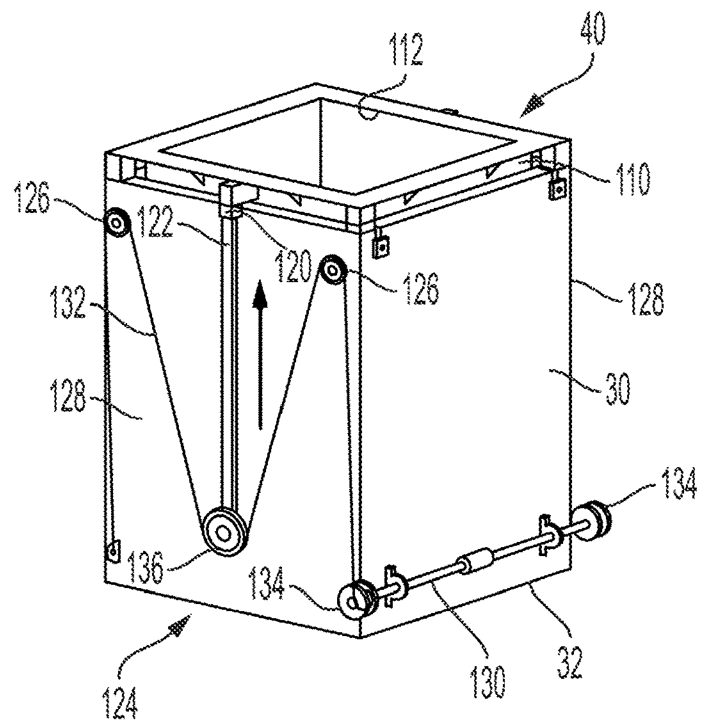
FIG. 8 shows an example upper noise attenuation system having an elongated conduit that has an exterior that is shaped and sized for complementary receipt therein the distal portion of the lower elongated plenum and showing the elongated conduit in the stored position according to an embodiment of the disclosure.
Figure 9:
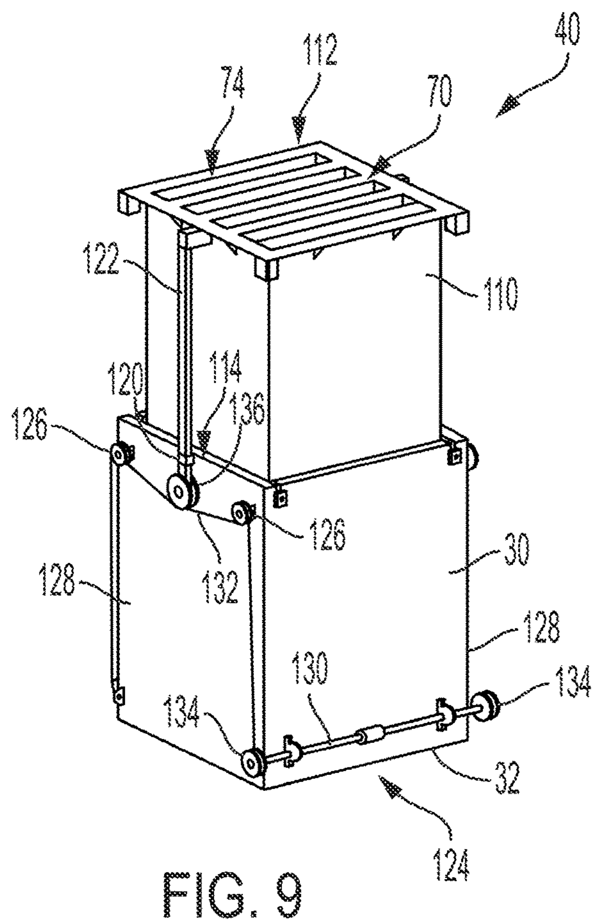
FIG. 9 shows an example upper noise attenuation system having an elongated conduit that has an exterior that is shaped and sized for complementary receipt therein the distal portion of the lower elongated plenum and showing the elongated conduit in the operative position according to an embodiment of the disclosure.
Figure 10:
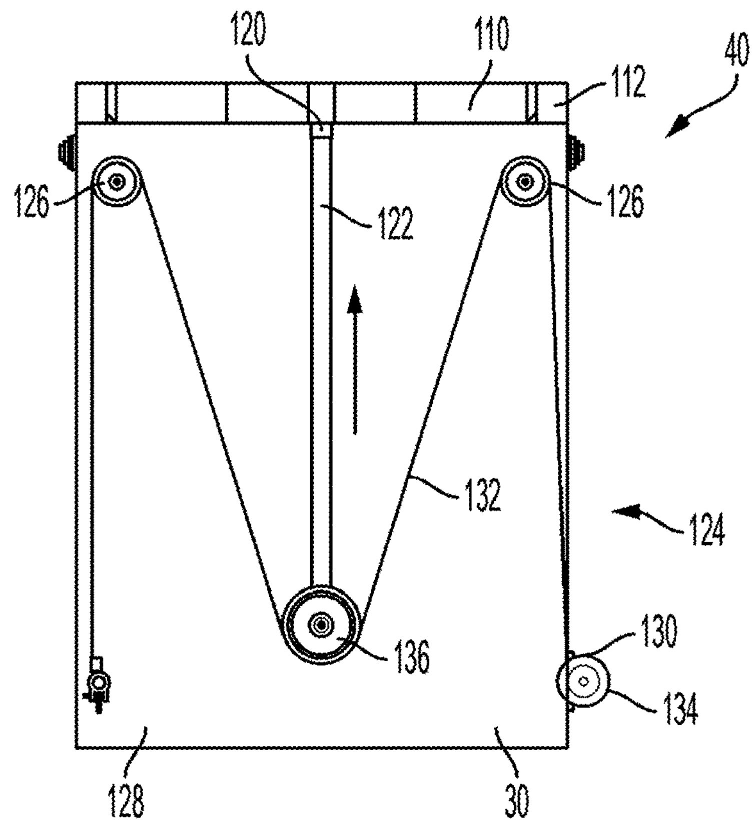
FIG. 10 shows an example guide mounted to an exterior surface of the lower elongated plenum, a rod configured for operative slideable receipt therein the slot of the guide, and means for selective axial movement of the rod for movement of the elongated conduit between the stowed position and the operative position according to an embodiment of the disclosure.

Referring now to the drawings in which like numerals indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances, and are a part of the disclosure. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

As used herein, the term "trailer" refers to any transportation assembly, including, but not limited to, a transport, truck, skid, and/or barge used to transport relatively heavy structures, such as fracturing equipment.

As used herein, the term "directly driven turbine" DDT refers to both the gas turbine and the mechanical energy transport sections of a directly driven turbine fracturing unit. The gas turbine receives hydrocarbon fuel, such as natural gas, and converts the hydrocarbon fuel into mechanical energy that is mechanically transferred via a gearbox to at least one fluid pump. It is further contemplated that a gas turbine as described herein may be a gas fueled turbine, a dual-fuel turbine, and the like.

In one embodiment, a mobile fracking system 10 may include a trailer 12, a gas turbine 14, and an exhaust attenuation system 20 configured to receive exhaust gas from the gas turbine. FIG. 1 is a schematic diagram of an embodiment of a mobile fracking system 10 showing the trailer 12 having a rear end, a front end, a bottom end, and a top end that defines an interior space. As shown, the gas turbine 14 is housed inside the trailer in the interior space. To improve mobility over a variety of roadways, the trailer may have a maximum height, a maximum width, and a maximum length that would be suitable for passage on conventional roads and expressways. Further, the trailer may comprise at least three axles used to support and distribute the weight on trailer. Other embodiments of the trailer may exceed three axles depending on the total transport weight and it is contemplated that the dimensions and the number of axles may be adjusted to allow for the transport over roadways that typically mandate certain height, length, and weight restrictions.

The trailer 12 may house at least one or more of the following equipment: (1) an inlet plenum; (2) the gas turbine 14; (3) the exhaust attenuation system 20 to remove exhaust gas from gas turbine into the atmosphere, (4) a gearbox and/or transmission 16 connected to a rotary output of the gas turbine, and (5) a fluid pump 18 operatively connected to the output of the gearbox. Other components not shown in FIG. 1, but which may also be located on the trailer include a control system, a turbine lube oil system, and a fire suppression system. The turbine lube oil system may be configured to selectively operate turbine lube oil filtering and cooling systems. In one embodiment, the fire suppression system may also comprise sprinklers, water mist, clean agent, foam sprinkler, carbon dioxide, and/or other equipment used to suppress a fire or provide fire protection for the gas turbine. Mounting of the turbine lube oil systems and the fire suppression system onto the DDT fracturing unit reduces trailer operative footprint by eliminating the need for an auxiliary transport and connections for the turbine and generator lube oil, filtering, cooling systems and the fire suppression system to the gas turbine generator transport.

One skilled in the art will appreciate that the gas turbine 14 may be configured to generate mechanical energy (i.e., rotation of a shaft) from a hydrocarbon fuel source, such as natural gas, liquefied natural gas, condensate, and/or other liquid fuels. As schematically illustrated, the gas turbine shaft is connected to the gearbox such that the gearbox converts the supplied mechanical energy from the rotation of the gas turbine shaft to a downstream shaft assembly that is rotated at a desired speed and torque to the downstream mechanically connected fluid pump. The gas turbine may be a gas turbine, such as the GE family of gas turbines, the Pratt and Whitney family of gas turbines, or any other gas turbine and/or dual-fuel turbine that generates sufficient mechanical power for the production of the desired level of brake horsepower to the downstream fluid pump for fracking operations at one or more well sites.

The trailer 12 may also comprise gas turbine inlet filter(s) configured to provide ventilation air and combustion air via one or more inlet plenums (not shown) to the gas turbine. Additionally, enclosure ventilation inlets may be added to increase the amount of ventilation air, which may be used to cool the gas turbine and ventilate the gas turbine enclosure. The combustion air may be the air that is supplied to the gas turbine to aid in the production of mechanical energy. The inlet plenum may be configured to collect the intake air from the gas turbine inlet filter and supply the intake air to the gas turbine.

In one embodiment and referring to FIGS. 2-11, the exhaust attenuation system 20 may be attached to a portion of the trailer and may include a lower elongated plenum 30 and an upper noise attenuation system 40 that is movably connected relative to the distal end of the lower elongated plenum. The lower elongated plenum 30 has a proximal end and a distal end and extends a first distance between the respective proximal and distal ends. The lower elongated plenum 30 defines an inlet 32 adjacent the proximal end of the lower elongated plenum 30 that is configured to receive exhaust gas from the gas turbine. In one aspect, the lower elongated plenum extends longitudinally away from a bottom surface of the trailer about an exhaust axis. The exhaust axis may be positioned at an angle relative to the bottom surface and, in one non-limiting example, may be substantially normal to the bottom surface, substantially vertical, and/or substantially upright.

It is contemplated that the exhaust attenuation system 20 will be constructed of materials that are capable of withstanding extreme temperatures, such as for example and without limitation, to about 1250° F. (676° C.), that are associated with exhaust gases exiting gas turbines.

In embodiments, the upper noise attenuation system 40 may be configured to be selectively movable between a stowed position and an operative, upright, position. In the stowed position, an outlet end portion 42 of the upper noise attenuation system is positioned proximate to the distal end of the lower elongated plenum, and, in the operative position, the upper noise attenuation system defines an upper elongated plenum 50 that is in fluid communication with the distal end of the lower elongated plenum. In this operative position, an outlet 52 of the upper noise elongated plenum is spaced away from the distal end of the lower elongated plenum at a second distance that is greater than the first distance. Further, it is contemplated that the upper noise attenuation system, in the operative position, may extend longitudinally away from the distal end of the lower elongated plenum about the exhaust axis.

The mobile fracking system affects a reduction in sound emission by increasing the effective length of the gas turbine exhaust stack. Attenuation of rectangular duct in the 63 Hz to 250 Hz octave frequency bands may be expressed as:

$$\Delta L_{duct} = 17.0\left(\frac{P}{S}\right)^{-.025} f^{-0.85} l \quad (1)$$

$$\Delta L_{duct} = 1.64\left(\frac{P}{S}\right)^{-0.73} f^{-0.58} l \quad (2)$$

TABLE 1

Exhaust attenuation with unlined rectangular duct

| Exhaust Reference | | Exhaust Duct | | Exhaust Duct with Proposed System | | |
|---|---|---|---|---|---|---|
| PWL dB | f Hz | $\Delta L_{duct, O}$ dB | PWL dB | $\Delta L_{duct, N}$ dB | $\Delta L_{duct, N} - \Delta L_{duct, O}$ dB | PWL dB |
| 120.0 | 63.5 | 2.90 | 116.1 | 4.06 | 1.16 | 114.9 |
| 129.0 | 125 | 1.96 | 127.0 | 2.74 | 0.78 | 126.2 |
| 127.0 | 250 | 1.31 | 125.7 | 1.83 | 0.52 | 125.2 |
| 127.0 | 500 | 0.88 | 126.1 | 1.23 | 0.35 | 125.8 |
| 126.0 | 1000 | 0.59 | 125.4 | 0.82 | 0.23 | 125.2 |
| 130.0 | 2000 | 0.39 | 129.6 | 0.55 | 0.16 | 129.4 |

For example, and without limitation, and taken from Table 1 above, proposed exhaust system may affect a 40% increase in sound attenuation and a maximum in 1.2 dB in sound pressure by selective operative increase in the elongate length of the exhaust plenum from 16.1 ft. to 22.6 ft.

In embodiments, the mobile fracking system 10 may include a first plenum 22 configured to receive exhaust gas from the gas turbine. In this aspect, a first end of the first plenum is connected to, and in fluid communication with, an exhaust outlet of the gas turbine and a second end of the first plenum connected to, and in fluid communication with, the inlet of the lower elongated plenum. For example, the gas turbine may be mounted to or otherwise supported thereon the bottom surface of the trailer and the first plenum may extend longitudinally substantially parallel to the bottom surface.

Optionally, the upper noise attenuation system 40 may include at least one array of baffles 70 that are configured to attenuate noise. The array of baffles 70 may include a plurality of baffles 72 that are distributed parallel to a common axis and that define a plurality of slots 74 defined by and between the plurality of baffles. In one exemplary aspect, the at least one array of baffles 70 may be mounted therein a portion of the upper elongated plenum in communication with the exhaust gas passing therethrough the upper elongated plenum to the outlet to supplement the noise dampening capabilities of the noise attenuation system.

In embodiments and referring to FIGS. 2-7, the upper noise attenuation system 40 may include a pair of opposed and cooperating silencer hoods 46. In this aspect, each silencer hood 46 may have a planer surface 48 having opposed side edges 50 and a pair of opposing side surfaces 52 that extend outwardly from portions of the respective side edges of the planer surface. Each silencer hood 46 may be configured to be hingeably mounted to portions of a distal end of the lower elongated plenum such that, in the operative position, the pair of opposed silencer hoods are positioned substantially upright so that the planer surfaces of the respective back edges are in parallel opposition and that the respective side surface are also in parallel opposition to form the elongated upper elongated plenum.

As exemplarily shown in the figures, the pair of opposed silencer hoods 46 may include an upper silencer hood 54 and a lower silencer hood 56 that are configured to cooperatively slideably engage relative to each other when moving therebetween the stowed position and the operative position. In this example, the respective opposed upper and lower silencer hoods may be opened in a sequential manner. First, the upper silencer hood may be raised independently from the lower silencer hood. As shown, an anchor point mounted on a back surface of the planar surface of the upper silencer hood proximate a bottom edge of the back surface may be connected to a wire that is operative connected to a spooling system that is configured for selective movement of the connected silencer hood between the stowed and operative positions. In operation, the spooling system is operated to open or otherwise urge the upper silencer hood to the operative position and may comprise a winch, such as, for example and without limitation, an electric winch, a hydraulic winch, a pneumatic winch, and the like. It is contemplated that, once the upper silencer hood is in the operative position, tension may be maintained on the wire to aid in maintaining the upper silencer hood in the operative position until the upper silencer hood is lowered to the stowed position for transport. Optionally, a mechanical limit switch on the spooling system that may be configured to determine distance the wire is required to move to open and close the respective silencer hoods 46.

Similarly, the lower silencer hood 56 may be raised independently from the upper silencer hood 54. As shown, an anchor point mounted on a back surface of the planar surface of the lower silencer hood proximate a bottom edge of the back surface may be connected to a wire that is operative connected to the spooling system. In operation, after the upper silencer hood is positioned in the operative position, the spooling system of the lower silencer hood may be operated to open or otherwise urge the lower silencer hood to the operative position. It is contemplated that, once the lower silencer hood is in the operative position, tension may be maintained on the wire to aid in maintaining the lower silencer hood in the operative position until the lower silencer hood is lowered to the stowed position for transport. In this example, the lower silencer hood would be lowered first in sequence when the respective opposed upper and lower silencer hoods are closed or otherwise moved to the stowed position.

As noted above, the respective upper and lower silencer hoods 54, 56 may be maneuvered to and about the operative and the stowed positions through the use of one or more actuators, such as linear actuators and/or rotary actuators, and in some embodiments, one or more cables and/or one or more mechanical linkages. In some embodiments, the one or more actuators may be electrically-actuated, pneumatically-actuated, and/or hydraulically-actuated (e.g., via hydraulic cylinders and/or hydraulic motors). For example, the respective upper and lower silencer hoods 54, 56 may be maneuvered to and about the operative and the stowed positions through the use of a spooling system comprising electrical, mechanical, and/or pneumatic winches that contain spooled wire that are connected to the anchor points strategically positioned on the respective upper and lower silencer hoods 54, 56.

Optionally, the exhaust attenuation system shown in FIGS. 2-5, 6A, 6B, and 7 may further include a retention brace system 90. In this aspect, the retention brace system may include a first pair of opposing retention braces 92 and a second pair of opposing retention braces 99. The first pair of opposing retention braces 92 may include a first brace 93 mounted to exterior portions of the distal end of the lower elongated plenum and a second brace 94 mounted to an opposed exterior portions of the distal end of the lower elongated plenum. Each brace of the first pair of opposing retention braces includes a bar 95 that extends between a first end mount 96 and an opposing second end mount 97 such that, when the respective first and second end mounts are positioned therein the lower elongated plenum, the bar is spaced from an exterior surface of the distal end of the lower elongated plenum and defines a slot 98 that is sized and shaped for receipt of portions of respective side surfaces of the pair of silencer hoods.

Similarly, the second pair of opposing retention braces 99 includes a third brace 100 spaced proximally from the first brace and mounted to exterior portions the lower elongated plenum and a fourth brace 102 spaced proximally from the first brace and mounted to an opposed exterior portions of the lower elongated plenum. In this aspect, each brace of the second pair of opposing retention braces includes a bar 95 extending between a first end mount 96 and an opposing second end mount 97 such that, when the respective first and second end mounts are positioned therein the lower elongated plenum, the bar is spaced from an exterior surface of the lower elongated plenum and defines a slot 98 that is sized and shaped for receipt of respective side surfaces of the pair of silencer hoods when the pair of silencer hoods is positioned in the stowed position.

In embodiments, the upper noise attenuation system 40 may include at least one array of baffles configured to attenuate noise that is mounted therein at least a portion of the planer surface of at least one or in each of the opposed silencer hoods.

In other embodiments and referring to FIGS. 8-11, the upper noise attenuation system 40 may optionally include an elongated conduit 110 that has an exterior surface shape that is shaped and sized for complementary receipt therein a distal portion of the lower elongated plenum 30. In this aspect, in the stowed position, the elongated conduit 110 is positioned substantially therein the lower elongated plenum such that an outlet end 112 of the elongated conduit is positioned proximate to the distal end of the lower elongated plenum. In the operative position, the elongated conduit 110 is selectively movable about and along an about an exhaust axis outwardly away from the distal end of the lower elongated plenum such that a proximal end 114 of the elongated conduit is positioned proximate the distal end of the lower elongated plenum and the outlet end 112 of the elongated conduit forms the outlet of the upper elongated plenum.

In this aspect, to operatively move or otherwise urge the elongated conduit 110 about and between the stowed and operative positions, the upper noise attenuation system 40 may include at least one guide 120 mounted to an exterior surface (e.g., at an upper end thereof) of the lower elongated plenum 30. As will be appreciated, the guide 120 may define an elongated enclosed slot extending parallel to the exhaust axis. A rod 122 having a distal end mounted to an outermost edge surface of the outlet end 112 of the elongated conduit 110 may be provided that is configured for operative slideably receipt therein the slot of the guide 120. To operatively move the rod 122 and thereby move the elongated conduit 110 relative to the lower elongated plenum 30, a means for selective axial movement of the rod 122 and thus for movement of the elongated conduit 110 may be provided for selective movement of the elongated conduit 110 between the stowed position (see, e.g., FIGS. 8 and 10) and the operative position (see, e.g., FIG. 9).

Figure 11:
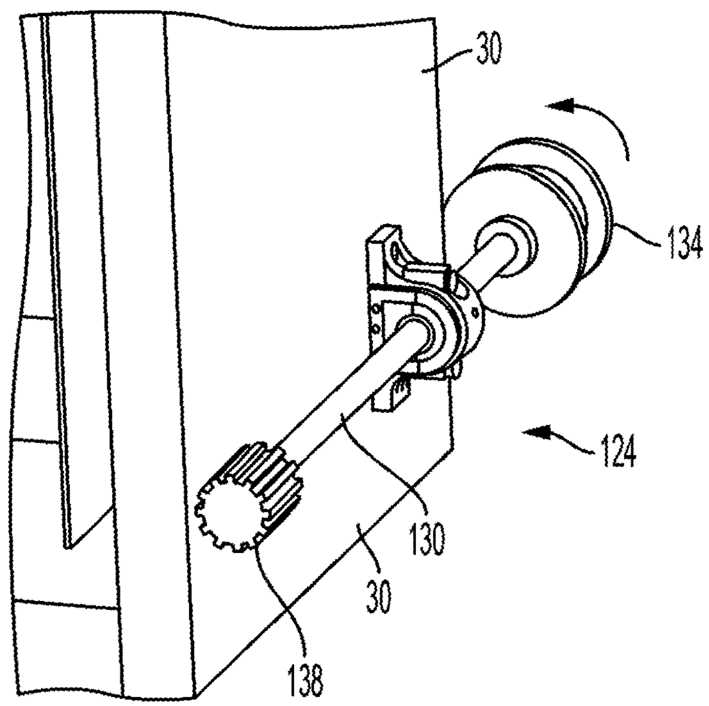
FIG. 11 schematically illustrates portions of a means for selective axial movement of the rod for movement of the elongated conduit between the stowed position and the operative position according to an embodiment of the disclosure.

As illustrated in FIGS. 8-11, selective axial movement of the rod 122 may be provided by an extension assembly 124. In some examples, the extension assembly 124 may include pairs of pulleys 126 connected to opposing sides 128 of the lower elongated plenum 30, and a drive shaft 130 coupled to the lower elongated plenum 30. The extension assembly 124 may also include a pair of cables 132, each of which is anchored to a lower end of the lower elongated plenum 30. A pair of drive wheels 134 may be connected to each end of the drive shaft 130, and each of the drive wheels 134 may be configured to retract or extend a respective one of the pair of cables 132, for example, such that retraction of the pair of cables 132 causes the rod 122 to push the elongated conduit 110 to extend from the lower elongated plenum 30 and into the operative position (see FIG. 9), and extension of the pair of cables 132 causes the rod 122 to return to a lowered position, thereby allowing the elongated conduit 110 to return to the stowed position (see FIGS. 8 and 10). In some examples, at ends of the respective rods 122 remote from the outlet end 112 of the elongated conduit 110, a rod pulley 136 may be provided for engaging a respective cable 132 to facilitate movement of the elongated conduit 110 relative to the lower elongated plenum 30. As shown in FIG. 11, in some examples, a drive gear 138 may be connected to the drive shaft 130 to facilitate rotation of the drive shaft 130 via an actuator including a mating gear, such as a linear actuator and/or a rotary actuator, for example, a gear shaft and a prime mover such as, for example, and without limitation, a winch. As one skilled in the art will appreciate, when such a prime mover is activated, the illustrated drive gear 138 of the drive shaft 130 rotates, which causes the complementary rotation of the drive wheels 134 connected to the respective ends of the drive shaft 130. In turn, the cables 132 will spool onto each of the drive wheels 134 and via the pulleys 126, will affect the translation of the proximal end of the respective rods 122 to extend the elongated conduit 110 into the operative position.

In this embodiment, the upper noise attenuation system may include at least one array of baffles configured to attenuate noise that may be mounted therein an outlet end of the elongated conduit.

It is contemplated that the means for selective axial movement of the rod for selective movement of the elongated conduit 110 between the stowed position and the operative position of the elongated conduit 110 may comprise one or more actuators, such as linear actuators and/or rotary actuators, and in some embodiments, one or more cables and/or one or more mechanical linkages. In some embodiments, the one or more actuators may be electrically-actuated, pneumatically-actuated, and/or hydraulically-actuated (e.g., via hydraulic cylinders and/or hydraulic motors). For example, selective movement of the elongated conduit 110 between the stowed position and the operative position of the elongated conduit 110 may be provided by the spooling system described above. In this aspect, the spooling system may comprise electrical, mechanical, and/or pneumatic winches that contain spooled wire and that are configured to spool wire onto each drum via the pulleys to affect the axial movement of the rod.

Optionally, the exhaust attenuation system 20 may further comprise a supervisory control system that is configured to utilize a series of digital input and output signals that will result in the controlled operation of the upper noise attenuation system 40. In this aspect, the exhaust attenuation system 20 may comprise a plurality of positional feedback sensors in communication with the supervisory control system. The positional feedback sensors are operatively mounted to respective portions of the upper noise attenuation system 40 such that the sensors may actuate when the upper noise attenuation system 40 is positioned in the stowed position and when in the operative, upright, position.

Each positional feedback sensor may comprise, for example and without limitation, a digital proximity switch that is configured to actuate when the positional feedback sensor's electromagnetic detection field comes in contact with a portion of the metallic surface of the exhaust stack. Upon actuation, each digital proximity switch is configured to send a digital signal to the supervisory control system indicative of the position of the respective upper and lower silencer hoods 54, 56 or, optionally, the respective position of the elongated conduit 110 relative to the distal end of the lower elongated plenum.

Optionally, it is contemplated that the positional feedback sensor may be an analog position sensor that is configured to provide positional feedback to the supervisory control system of the positions of the respective upper and lower silencer hoods 54, 56 or, optionally, the respective position of the elongated conduit 110 relative to the distal end of the lower elongated plenum. In this exemplary aspect, the analog position sensor may be configured to transmit a scaled current or voltage signal that depending on the value allows the control system to identify the accurate position of the upper noise attenuation system 40. An exemplary analog position sensor, such as a Sick absolute encoder, models AFS/AFM60 SSI, would be suitable for this application.

The positional feedback sensors allow the operator to know the position of the respective upper and lower silencer hoods 54, 56 or, optionally, the respective position of the elongated conduit 110 relative to the distal end of the lower elongated plenum and to further allow for the protection of equipment on the gas turbine skid. For example, the supervisory control system may generate an interlock signal that would prohibit the ignition of the gas turbine engine upon receipt of a signal from the respective positional feedback sensors that indicates that the upper noise attenuation system 40 is in the closed position. Thus, the interlock signal preventing turbine operation into a sealed cavity prevents the possibility of serious damage to the turbine engine due to undesired backpressure.

In operational aspects, it is contemplated that the upper noise attenuation system 40 may be actuated to move between the stowed and operative positions by manual operation of a physical lever. In this aspect, and if the spooling system includes a pneumatic winch, the selective actuation of the manual level may allow for the flow of air to the pneumatic motor resulting in rotary motion at the winch. Optionally, if the spooling system includes a hydraulic winch, the selective actuation of the manual level may allow for the flow of hydraulic oil into the stator of the hydraulic motor to produce the desired rotary motion and torque to actuate the upper noise attenuation system 40. In a further, exemplary aspect, if the spooling system includes an electrical winch, a switching device may be provided that is configured to allow for the selective application of current to the electric winch motor. The switching device may exemplarily be in the form of a toggle switch that allows the electrical circuit to the motor to be completed upon actuation such that the electric motor performs the desired rotary motion.

In a further optional aspect, the supervisory control system of the exhaust attenuation system 20 may comprise a SCADA (supervisory control and data acquisition) system. Exemplarily, if pneumatic and/or hydraulic winches are used, a directional control valve with an electrical coil may be positioned between the respective pressurized sources of air or oil and the downstream pneumatic or hydraulic motors. Operationally, an operation signal transmitted or outputted to the directional control valve from the SCADA system upon operator input. In this aspect, the operation signal could be a PWM signal with reverse polarity. For example, when the operator pushes an input on a human machine interface, which is identified by the programmable logistical controller, and the necessary output operation signal is sent to the directional control valve that allows for proportional flow of the required air or oil media to the winch motor. Optionally, this methodology may also be used for an electrical winch but, in this aspect, the output operation signal would energize a relay that allows for low voltage, high current power to reach the electrical motor and perform the proportional operation function. It is contemplated that these actuation functions may be made fully autonomous by implementing a start-up sequence such that, when the operator selects to start the unit, a series of sequenced signal outputs are driven around the frac pump trailer that will verify that the exhaust attenuation system 20 is in the open, operative position, the auxiliary power is verified to be on line, the necessary safety and communication checks performed, and then the gas turbine is allowed to start. In this exemplary aspect, a single input to actuate the exhaust attenuation system 20 to move to the open, operative position may initiate the issuance of a series of outputs from the SCADA system, which may save the operator time and may reduce complexity of how to individually perform these sequential outputs.

This application is a continuation of U.S. Non-Provisional application Ser. No. 16/948,290, filed Sep. 11, 2020, titled "TURBINE ENGINE EXHAUST DUCT SYSTEM AND METHODS FOR NOISE DAMPENING AND ATTENUATION," which claims priority to and the benefit of, U.S. Provisional Application No. 62/704,567, filed May 15, 2020, titled "TURBINE ENGINE EXHAUST DUCT SYSTEM FOR NOISE DAMPENING AND ATTENUATION," and U.S. Provisional Application No. 62/899,957, filed Sep. 13, 2019, titled "TURBINE ENGINE EXHAUST DUCT SYSTEM FOR NOISE DAMPENING AND ATTENUATION," the disclosures of both of which are incorporated herein by reference in their entireties.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed:

1. An exhaust attenuation assembly to receive exhaust gas from a gas turbine attached to a trailer, the exhaust attenuation assembly to attach to a portion of the trailer and comprising:

a lower elongated plenum having a proximal end and a distal end, the lower elongated plenum extending a first distance between the proximal end and the distal end, and having an inlet positioned adjacent the proximal end to receive exhaust gas from the gas turbine; and an upper noise attenuation system movably connected relative to the distal end of the lower elongated plenum, the upper noise attenuation system being selectively movable between a stowed position, in which an outlet end of the upper noise attenuation system is positioned proximate the distal end of the lower elongated plenum, and an operative position, in which the upper noise attenuation system defines an upper elongated plenum in fluid communication with the distal end of the lower elongated plenum and in which the outlet end of the upper elongated plenum is spaced away from the distal end of the lower elongated plenum at a second distance that is greater than the first distance, the upper noise attenuation system further comprising an elongated conduit configured for complementary receipt in relation to the lower elongated plenum, a rod having a first end connected to a surface of the elongated conduit at the outlet end, a guide configured for operative slideable receipt of the rod, and a second end of the rod connected to one or more:

(a) sheaves, or (b) pulleys configured for movement of the elongated conduit between the stowed position and the operative position.

2. The exhaust attenuation assembly of claim 1, wherein a top portion of the elongated conduit comprises at least one array of baffles that extend horizontally in the top portion of the elongated conduit, the array of baffled configured to attenuate noise.

3. The exhaust attenuation assembly of claim 1, further comprising a first plenum configured to receive exhaust gas from the gas turbine, a first end of the first plenum configured to be connected to an exhaust outlet of the gas turbine and a second end of the first plenum connected to the inlet of the lower elongated plenum.

4. The exhaust attenuation assembly of claim 3, wherein the first plenum is configured to be connected to the trailer to extend longitudinally substantially parallel to a bottom surface of the trailer.

5. The exhaust attenuation assembly of claim 1, wherein the lower elongated plenum is configured to extend longitudinally away from a bottom surface of the trailer about an exhaust axis.

6. The exhaust attenuation assembly of claim 5, wherein the upper noise attenuation system, in the operative position, extends longitudinally away from the distal end of the lower elongated plenum about the exhaust axis.

7. The exhaust attenuation assembly of claim 6, wherein the exhaust axis is substantially perpendicular relative to the bottom surface of the trailer.

8. The exhaust attenuation assembly of claim 1, wherein the upper noise attenuation system further comprises at least one array of baffles configured to attenuate noise.

9. The exhaust attenuation assembly of claim 8, wherein the array of baffles comprises a plurality of baffles distributed parallel to a common axis and that define a plurality of slots defined by and between the plurality of baffles.

10. The exhaust attenuation assembly of claim 9, wherein the at least one array of baffles is mounted in a portion of the upper elongated plenum for communication with the exhaust gas passing through the upper elongated plenum to the outlet.

* * * * *